(12) United States Patent
Winkler

(10) Patent No.: US 6,746,646 B2
(45) Date of Patent: Jun. 8, 2004

(54) METHOD AND APPARATUS FOR THE DISINFECTING BIOSOLIDS

(75) Inventor: Joseph A. Winkler, Lafayette, LA (US)

(73) Assignee: Phoenix Resource Recovery, Inc., Lafayette, LA (US)

(*) Notice: Subject to any disclaimer, the term of this patent is extended or adjusted under 35 U.S.C. 154(b) by 280 days.

(21) Appl. No.: 10/016,176

(22) Filed: Oct. 30, 2001

(65) Prior Publication Data

US 2003/0082071 A1 May 1, 2003

(51) Int. Cl.[7] .................................................. A61C 2/00
(52) U.S. Cl. ............................ 422/26; 34/379; 34/381; 210/609; 210/769; 210/710; 422/295; 422/299
(58) Field of Search ................... 422/1, 3, 26, 299, 422/295; 210/609, 710, 769; 34/379, 331

(56) References Cited

U.S. PATENT DOCUMENTS

| 4,028,242 A |   | 6/1977 | Kokurin et al. |
| 4,290,269 A | * | 9/1981 | Hedstrom et al. ............ 60/670 |
| 4,540,495 A |   | 9/1985 | Holloway |
| 5,426,866 A |   | 6/1995 | Rumocki |
| 5,738,761 A |   | 4/1998 | Fletcher |
| 6,030,538 A | * | 2/2000 | Held .......................... 210/748 |
| 6,103,191 A | * | 8/2000 | Luker .......................... 422/38 |
| 6,256,902 B1 | * | 7/2001 | Flaherty et al. ................ 34/379 |
| 6,673,247 B2 | * | 1/2004 | Olson .......................... 210/710 |

* cited by examiner

*Primary Examiner*—Krisanne Thornton
(74) *Attorney, Agent, or Firm*—William W. Stagg

(57) ABSTRACT

A biosolids treatment system comprising a storage tank for containing a quantity of biosolids sludge, a system of disinfection piping within the storage tank comprised of a segment of inner biosolids piping having a plurality of holes spirally arranged at a desired spacing around its perimeter concentrically arranged with a segment of outer steam piping, delivery pumps for delivering a quantity of biosolids to the storage tank, biosolids pumps for delivering a flow of biosolids from the storage tank to the inner biosolids piping; and steam pumps for delivering a flow of steam to the outer steam piping and thereby injecting a flow of steam from the outer steam piping into the inner biosolids piping for thermally disinfecting the flow of biosolids in the inner biosolids piping. The system includes computerized controls for continuously and simultaneously monitoring and operating the biosolids and steam pump means. The system delivers disinfected biosolids for use in land farm disposal of biosolids and for use an agricultural soil additive.

31 Claims, 4 Drawing Sheets

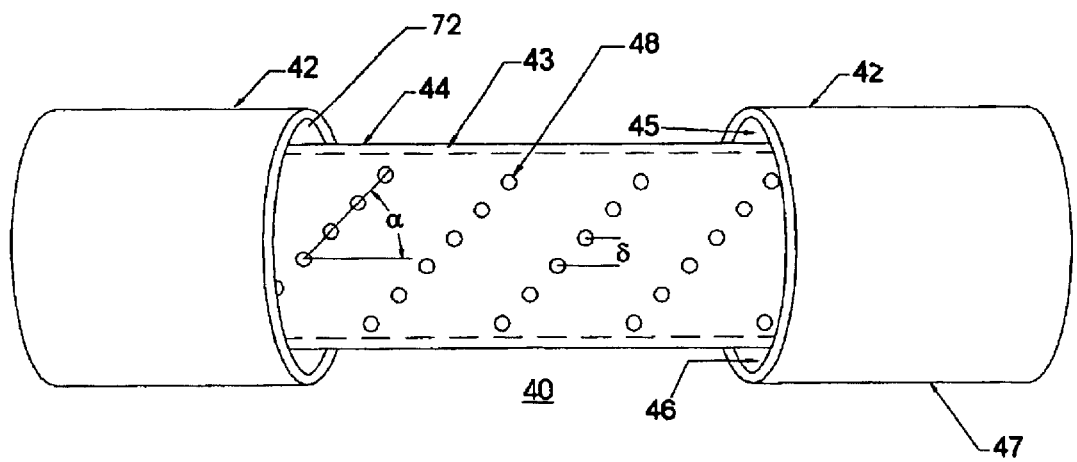
FIGURE 2
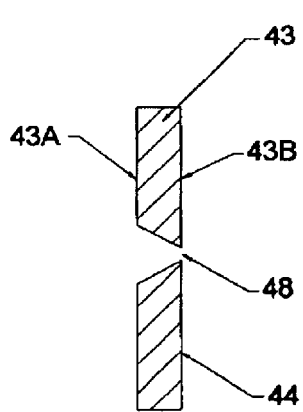   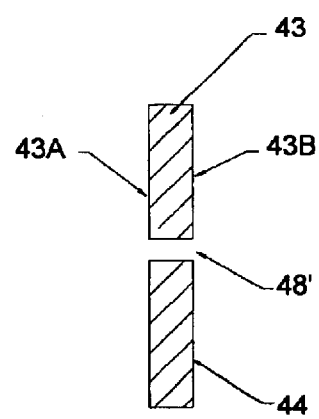
FIGURE 3A                FIGURE 3B

METHOD AND APPARATUS FOR THE DISINFECTING BIOSOLIDS

FIELD OF INVENTION

The present invention generally relates to the field of wastewater treatment and disposal and more particularly relates to an apparatus and method for disinfecting biosolids to facilitate their use in land farming and as a soil additive.

BACKGROUND OF INVENTION

Sewage, or wastewater, produced from municipal, industrial, or agricultural generators is typically comprised of a quantity of solids generated from humans, animals, fish or other living organisms, commonly called "biosolids", suspended in a quantity of water. Such biosolids, also known as sewage sludge, pose threats to the health and safety of the environment because of the harmful pathogens, bacteria and microorganisms that are typically present in such biosolids. It is recognized that processing the wastewater by separating the water from the biosolids and treating and re-using the water and the biosolids is of great value in extending the useful life of limited earth and water resources and in preventing the communication of diseases.

Water that results when the biosolids are separated from the wastewater is usually treated with chlorine as a chemical disinfectant and discharged into the nearest river or stream where it is ultimately returned to a water supply system for re-use. Treated biosolids are often disposed of by delivering the treated biosolids to a landfill, to land farms for spreading the treated biosolids over available land, by incineration, by disposal at sea or by use of the treated biosolids for agricultural purposes such as a soil additive. Regardless of the disposal method employed on the biosolids derived from the wastewater, any safe biosolids disposal method requires the elimination, or at least the sufficient inactivation, of the harmful pathogens, bacteria and other microorganisms present in the biosolids. Thus, some type of disinfecting method must be employed before the disposal or reuse of the biosolids.

A range of treatments can be applied to disinfect the biosolids. Such treatments include pasteurization (dry heat), aerobic (oxidative) or anaerobic digestion, composting, lime stabilization, liquid storage and dewatering and dry storage. None of these methods fully kills or deactivates all of the live microorganisms or the vegetative or spore-forming microorganisms typically present in biosolids.

Disinfecting sewage by continuous thermal processing employing two-stage steam heat has been proposed in U.S. Pat. No. 4,028,242 to Kokurin et al. The first stage of the process discussed in Kokurin et al. is a first nozzle employed for mixing sewage drawn from a holding tank with a supply of steam in a pressurized piping system. The second stage is introducing the steam/sewage mix to a pressurized pipe coil via a second nozzle and maintaining the flow through the coil at a desired temperature for a desired time by mechanical means to facilitate the disinfecting of the sewage. A disadvantage of the method presented is that the mechanical augers, called cyclones in Kokurin et al., employed in the pipe coil to circulate and disperse the flowing sewage to facilitate thorough heating of the sewage are complicated and may require frequent and costly maintenance. Still another disadvantage is that the system presented makes no provision to prevent heat loss from the pipe coil as the sewage is conveyed through the coil. As a result, a need still exists for an apparatus and method to thermally treat and disinfect a continuous flow of biosolids from a stream of wastewater, avoid where possible mechanical conveying means, and reduce heat losses associated with such thermal treatment.

SUMMARY OF INVENTION

The present invention is designed to provide an apparatus and method to facilitate the thorough thermal disinfecting of biosolids generated from a stream of wastewater. The apparatus and method employs a means for producing a continuous flow of biosolids derived from wastewater, by way of biosolids input piping and pumps, to a biosolids storage tank. A uniquely configured steam disinfecting piping system is arranged within the biosolids storage tank. A second pumping system delivers a continuous flow of biosolids to the steam disinfecting piping system. A steam generating means provides a continuous supply of steam, by way of steam piping and steam pumps, to the steam disinfecting piping system. The heat produced by circulating steam disinfects biosolids circulating through the steam disinfecting piping system. Recovered steam is returned to the steam generating means. Volatile gases produced from the biosolids during disinfecting are delivered to an incineration system. Disinfected biosolids are collected for delivery either to a landfill, an incinerator, or collected for use in land farming or as a soil additive.

The uniquely configured steam disinfecting piping system of applicant's invention is comprised of an outer steam pipe and an inner biosolids pipe that runs through the bore of the outer steam pipe. The inner biosolids pipe is configured to have a plurality of spaced apart holes spirally arranged along the periphery of the wall of the inner pipe. These spaced apart holes on the wall on the inner biosolids pipe serve as a plurality of nozzles for injecting a continuous spiraling stream of steam from the outer steam pipe to the biosolids flowing within the inner biosolids pipe.

The spiraling stream of steam created by the plurality of nozzles cause the biosolids flowing through the inner biosolids to rotate or spiral as they flow through the inner biosolids pipe. As a consequence, the spiraling biosolids are mixed with the steam and rotated around within the inner biosolids pipe. This spiraling of the biosolids creates an environment within the inner biosolids pipe that provides for a more even heating of the biosolids with live steam as the biosolids flow through the disinfecting piping system, thus enhancing the disinfecting of the biosolids.

The effectiveness of the disinfecting of the biosolids is dependent upon the amount of time that the flow of biosolids is exposed to the steam treatment. Manipulating the rate of flow of biosolids being pumped though the inner biosolids piping and the pressure of the steam in the outer steam piping can produce a desired treatment time. A computerized control system may be provided to monitor and regulate both steam pressure and pumping rates. Temperatures and pressures can be monitored along the disinfecting piping system and pumping rates and steam pressures can be adjusted to achieve a desired treatment time and temperature of the biosolids.

Ideally, the steam disinfecting piping system is arranged within the biosolids storage tank in a coiled or spiral configuration. The coil configuration serves a means to compensate for expansions and contractions in the piping system due to heat. The heat generated by the steam circulating in the disinfecting piping system also serves to heat the biosolids held in the biosolids storage tank prior to the biosolids introduction into the piping system, reducing heat losses in the disinfecting system.

BRIEF DESCRIPTION OF THE DRAWINGS

FIG. 2 is a schematic cut-a-way illustration of the disinfecting piping system forming a portion of the apparatus illustrated in FIG. 1.

FIG. 3A is a schematic cross-sectional view of the wall of the inner biosolids pipe of the disinfecting piping system illustrated in FIG. 2 cut through the steam holes.

FIG. 3B is a schematic cross-sectional view of the wall of the inner biosolids pipe of the disinfecting piping system illustrated in FIG. 2 cut through an alternative embodiment of the steam holes.

DESCRIPTION OF EMBODIMENTS

Figure 1:
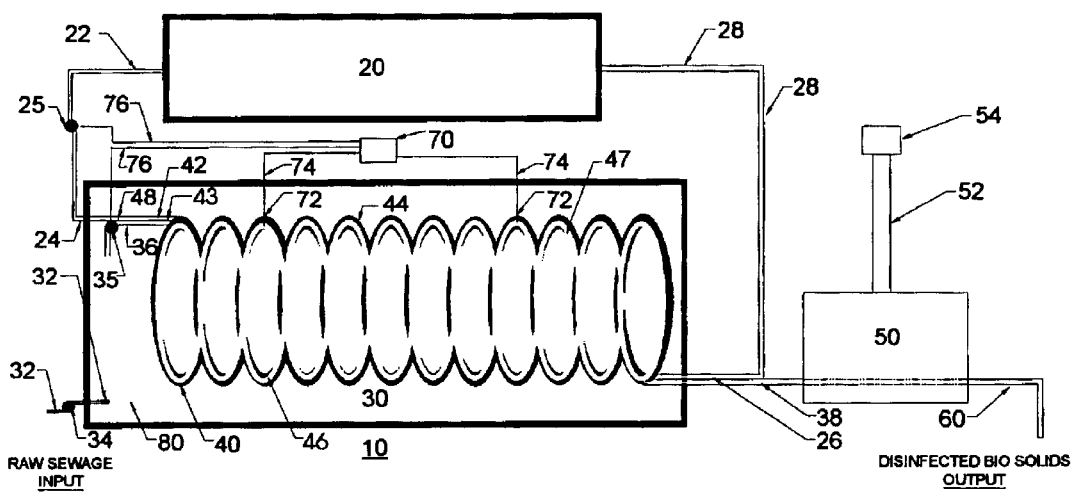
FIG. 1 is a schematic illustration of the apparatus according to applicant's invention.

Referring now to the drawings and more particularly to FIG. 1 there is shown is a schematic illustration of the apparatus according to applicant's invention. The thermal disinfecting system (10) is designed to disinfect biosolids, typically sewage sludge, generated from humans, animals, fish or other living organisms suspended in a quantity of wastewater. During processing, the suspended biosolids are separated from the wastewater by any number of known dewatering devices and techniques such as a dewatering centrifuge. Solids so separated from wastewater will typically still have substantial water content that allows the separated solids to be transported via piping and pumping systems. The solids disinfecting system of applicant's invention is especially suited for disinfecting these dewatered biosolids.

The thermal disinfecting apparatus (10) is comprised of a means for generating steam shown as a steam generating plant (20), a biosolids storage tank (30) for holding a desired quantity of contaminated biosolids, such as municipal sewage sludge, and a disinfection piping system (40) positioned within the storage tank (30). Biosolids to be disinfected are delivered to the storage tank (30) through supply line (32) by way of supply pump (34). The disinfection piping system (40) shown in FIG. 1 is arranged in a helical coil within the storage tank (30) though other piping arrangements may be utilized.

The disinfection piping system is comprised of an outer steam pipe (42) and an inner biosolids pipe (44). Biosolids to be disinfected are delivered from the storage tank (30) via solids suction lines (32) and input pump (34). Biosolids from the storage tank (30) are then delivered to the bore (46) of the biosolids pipe (44) through contaminated biosolids input lines (36) in communication with the biosolids pipe (44) by means of input circulation pumps (35). Steam from the steam generation plant (20) is delivered, at a desired temperature and pressure, by steam supply lines (22) via steam pumps (25) to the steam entrance line (24) that is in communication with the bore (43) of the outer steam pipe (42). The heat produced in the bore (43) of the outer steam pipe (42) by the steam so delivered raises the temperature of the biosolids to a desired level as the biosolids course through the inner biosolids pipe (44). The rate of flow through the biosolids pipe (44) and the temperature of the biosolids control the level of disinfection of the biosolids.

Sensors (72) may be placed along the inner wall (47) of the biosolids pipe (44) to monitor the pressure, temperature and flow rate of the steam and the circulating biosolids. Signals, shown as flow line (74), reflecting pressure, temperature and flow rate are delivered to control console (70). The signals may be delivered via digital or analog signals on electrical leads or by wireless technology. Similarly, the control console (70) has means for delivering control signals, shown as flow line (76), to the steam pumps (25) and biosolids pumps (35) to make adjustments in steam pressure and temperature and biosolids flow rate to maximize the disinfection process. These control signals may be delivered via digital or analog signals on electrical leads or by wireless technology.

The system (10) is designed to recycle as much energy as possible. The disinfection piping system (40) is placed in the solids storage tank so that any escaping heat is utilized to preheat the biosolids to be disinfected and thereby minimize heat losses in the system. Steam discharged from the steam pipe (42) of the piping system (40) is delivered to steam exit lines (26) and returned to the steam generation plant (20) for recycling via steam return lines (28).

Disinfected biosolids are received from the bore (46) of the biosolids pipe (44) via disinfected biosolids discharge piping (38). Depending upon the presence of volatile organic chemicals (commonly known as VOCs) in the biosolids being processed, the disinfected biosolids delivered to the discharge piping (38) may be routed to a VOC extraction unit (50) for removal of any volatile gases that may be present in the biosolids. Volatile gases so extracted are collected at gas bleed off line (52) and delivered to an incinerator (54) or other processor for disposal. The disinfected biosolids so processed are then discharged via treated biosolids output lines (60) for collection and ultimate disposal by delivery of the disinfected biosolids either to a landfill, an incinerator, or collection for use in land farming or as a soil additive.

It is thought that the storage tank (30) and all supply and discharge piping be fabricated of a corrosion resistant material such as stainless steel to reduce the caustic effect of the biosolids. Similarly, it is thought that the disinfection coil (40) be fabricated of a corrosion resistant such as stainless steel or stainless steel that has been glass lined to further reduce the caustic effects of the biosolids during the disinfection process.

FIG. 2 shows a cut-a-way schematic view of the disinfection piping system (40). The disinfection piping system (40) is comprised of the outer steam pipe (42) having a bore (46) within which is positioned the Inner biosolids pipe (44). The annulus (45) of the bore (46) created by the inner biosolids pipe (44) and the wall (47) of the outer biosolids pipe (42) defines the space through which the steam circulates as it courses through the outer steam pipe (42). Temperature and pressure sensors (72) are placed at desired locations along the inside of wall (47).

The wall (43) of the inner biosolids pipe (44) has a plurality of spaced apart holes (48) spirally arranged along its periphery. These spaced apart holes (48) on the wall (43) of the inner biosolids pipe (44) serve as a plurality of nozzles for injecting a continuous spiraling stream of steam from the annulus (45) outer steam pipe (44) to the biosolids flowing within the inner biosolids pipe (42). The streams of spiraling steam from the holes (48) impart a spiraling motion to the biosolids coursing through the inner biosolids pipe (44), which serves to mix and blend the biosolids facilitating their disinfection. It is thought that arranging the plurality of spirally arranged spaced apart holes (48) at angle α with respect to the centerline of the inner pipe (44) of between about 22.5 degrees and about 60 degrees will impart a sufficient spiraling effect to the biosolids in the pipe (44). The lateral spacing β between the holes (48) will depend upon the inner diameter of the pipe (44) selected. As an example, it is thought that a spacing β of between about 3 inches and about 5 inches for a pipe (44) having an interior diameter between about 3 inches and about 10 inches would be sufficient for applicant's invention.

FIG. 3A shows a schematic cross-sectional view of the wall (43) of the inner biosolids pipe (44) through a hole (48). The wall (43) has an outer surface (43A) and an inner surface (43B). It is thought that each hole (48) be tapered so as to have a wider diameter on the outer surface (43A) than on the inner surface (43B) so as to enhance its nozzle effect. It is thought that a hole (48) tapered so as to have a diameter on the outer surface (43A) of the pipe wall (43) between about 1.5 to about 3 times greater than its diameter on the inner surface (43B) of pipe wall (43) would be sufficient. As an example, in a pipe (44) having a wall (43) with a thickness between 0.375 inches and 0.625 inches, it is thought that a hole (48) having a diameter of 0.25 inches on the outer surface (43A) of the biosolids pipe (44) and a diameter of 0.083 inches on the inner surface (43B) of the biosolids pipe (44) would be sufficient to provide the desired nozzle effect.

FIG. 3B shows a schematic cross-sectional view of an alternate configuration of wall (43) of the inner biosolids pipe (44) through a hole (48'). In this embodiment the hole (48') penetrates the wall (43) from its outer surface (43A) to its inner surface (43B) in a substantially uniform cross-section so that, in the case of a circular hole, the diameter of the hole is the same on the outer surface (43A) as it is on the inner surface (43B). It is thought that a hole (48') having a diameter of about 0.1875 inches to about 0.375 inches would be sufficient to provide the desired nozzle effect.

Figure 4:
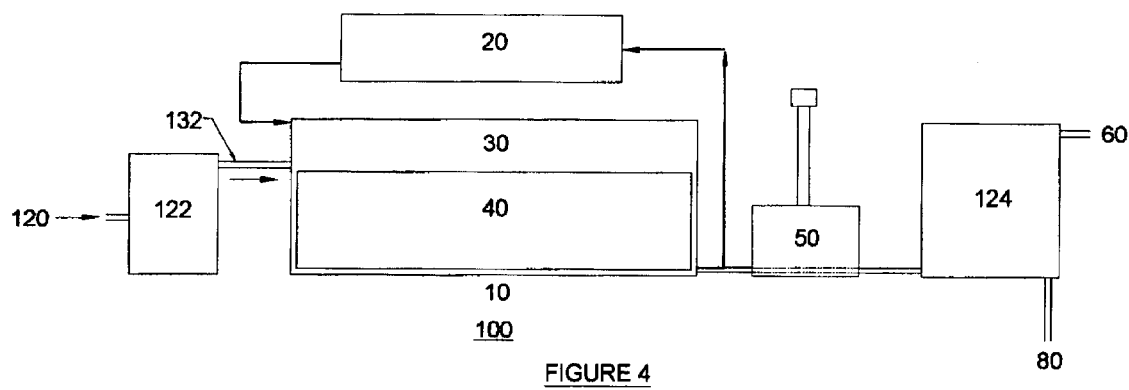
FIG. 4 is a schematic illustration of the apparatus of FIG. 1 employed for use in a sewage treatment system.

FIG. 4 is a schematic view of a typical municipal sewage facility (100) incorporating the disinfecting system (10) of applicant's invention. The system (10) is comprised of a steam generation plant (20), a storage tank (30) and disinfection piping system (40) having the inner biosolids piping (44) and the outer steam piping (42) described above. The facility (100) receives a supply of municipal sewage from input line or lines (120) to a primary centrifuge (122) for initial dewatering. Dewatered sewage solids are transported via piping (132) to the storage tank (30). Biosolids are then transported from the storage tank (30) to the disinfection piping system (40) for thermal treatment by steam produced by steam generation plant (20). Solids thermally disinfected by the system (10) are delivered to an incinerator-type VOC extraction unit (50) for removal of any volatile gases that might be contained in the disinfected solids. After removal of any volatile gases the solids are then transported to a secondary centrifuge/dryer or filter press (124) for further dewatering. The dewatered solids are then discharged via output lines (60) as described above for disposal as desired. Any water removed during this dewatering process is discharged via water discharge lines (80) for disposal as desired.

In the typical municipal sewage facility (100) incorporating the disinfecting system (10) of applicant's invention sewage disinfection process, the initial centrifuge (122) may be a continuous flow dewatering device such as that manufactured by Bird® Machine Company. A centrifuge (122) that is capable of dewatering the sewage from greater than 99 percent water content to a 92 percent water content, thereby raising the biosolids content of the sewage from less than 1 percent to greater than 8 percent is thought to be sufficient. The centrifuge/dryer (124) may be a filter press dryer such as those manufactured by EIMCO® or, alternatively, a centrifuge type dryer such as those manufactured by Bird® Machine Company.

Figure 5:
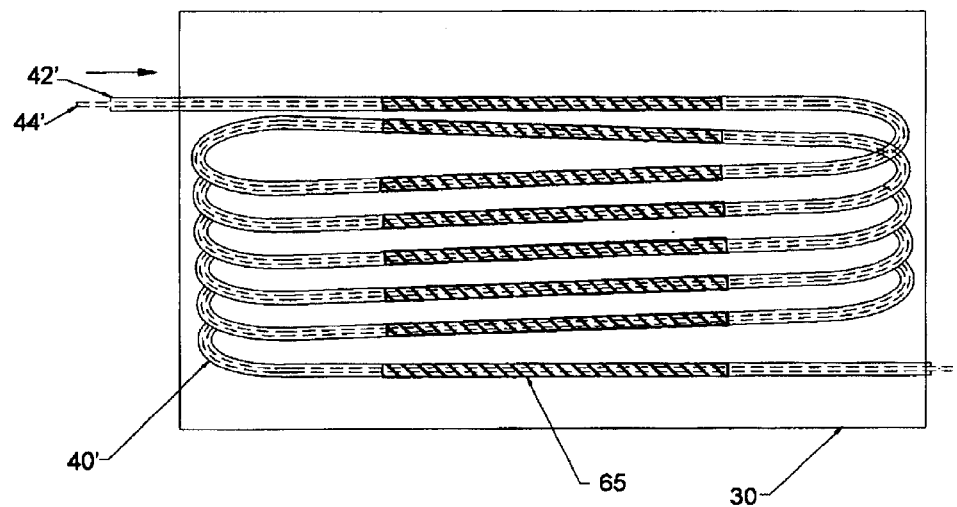
FIG. 5 is an alternate embodiment of the disinfecting piping system of applicant's invention.
Figure 6:
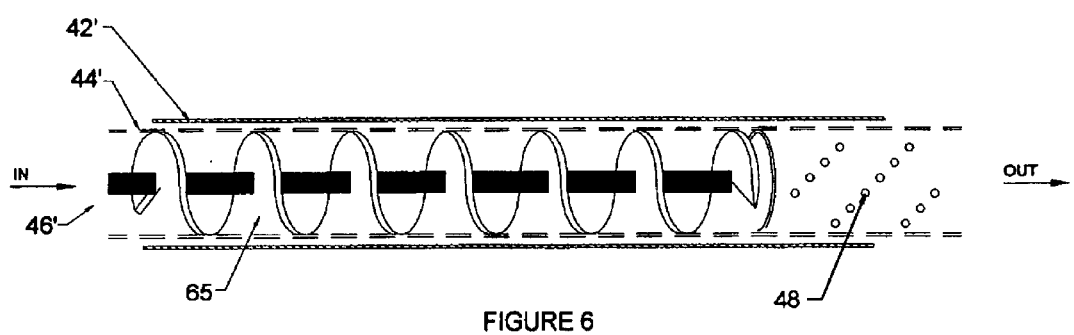
FIG. 6 is a schematic illustration of the solids conveying mechanism of the disinfecting piping system of FIG. 5.

FIG. 5 is an alternate embodiment of the disinfection piping system (40) designated as (40'). The system (40') is configured in a coil so as to be contained within the solids storage tank (30) and is comprised of an outer steam pipe (42') and an inner solids pipe (44'). The inner solids pipe (44') has a plurality of rotatably mounted Archimedes spiral screws (65), shown in FIG. 6, positioned within bore (46') of the inner solids pipe (44') to aid in mixing the flowing biosolids conveyed through the piping system (40'). Steam at a desired temperature and pressure is delivered to the outer steam pipe (42'), and then thorough the inner pipe (44') via a plurality of holes (48) as described above, to rotate the Archimedes spiral screws (65) and flowing biosolids insure even heating of the biosolids from the steam thereby thermally disinfecting the circulating solids contained in the inner biosolids piping (42'). Temperature and flow rates may be monitored and controlled by sensors (72) and control console (70) as described above.

I claim:

1. A biosolids treatment system comprising:
   (a) a storage tank for containing a quantity of biosolids sludge;
   (b) a system of disinfection piping, said system of disinfection piping comprised of inner biosolids piping concentrically arranged with outer steam piping, said inner biosolids piping having a plurality of holes arranged at a desired spacing around its perimeter;
   (c) first biosolids pump means for delivering a quantity of biosolids to said storage tank for disinfection;
   (d) second biosolids pump means for delivering a flow of biosolids from said storage tank to said inner biosolids piping;
   (e) steam pump means for delivering a flow of steam to said outer steam piping and thereby injecting a flow of steam from said outer steam piping into said inner biosolids piping through said holes in said inner biosolids piping; and
   (f) control means for continuously and simultaneously operating said first and second biosolids pump means and said steam pump over a predetermined period of time for circulating a flow of biosolids through said inner biosolids piping simultaneously with a flow of steam through said outer steam piping performing.

2. The biosolids treatment system as recited in claim 1 wherein said system of disinfection piping is positioned within said storage tank.

3. The biosolids treatment system as recited in claim 1 wherein said control means includes means for determining the temperature of said flow of biosolids at desired points along said system of disinfection piping and delivering said determined temperatures to said control means.

4. The biosolids treatment system as recited in claim 3 wherein said control means includes means for determining the temperature and pressure of said flow of steam at desired points along said system of disinfection piping and delivering said determined temperatures and pressures to said control means.

5. The biosolids treatment system as recited in claim 4 wherein said plurality of holes arranged around the perimeter of said inner biosolids piping are arranged so as to form a spiral of holes around said inner biosolids piping.

6. The biosolids treatment system as recited in claim 5 wherein said spiral of holes around said inner biosolids piping are arranged with respect to the centerline of said inner biosolids pipe at an angle between about 22.5 degrees to about 60 degrees.

7. The biosolids treatment system as recited in claim 6 wherein said inner biosolids piping is between about 3 inches to about 10 inches in diameter.

8. The biosolids treatment system as recited in claim 7 wherein the lateral spacing between said holes in said inner biosolids piping is between about 3 inches to about 5 inches.

9. The biosolids treatment system as recited in claim 5 wherein said holes in said inner biosolids piping are tapered.

10. The biosolids treatment system as recited in claim 8 wherein said holes in said inner biosolids piping are tapered.

11. A biosolids treatment system comprising:
   (a) a storage tank for containing a quantity of biosolids sludge;
   (b) a system of disinfection piping, said system of disinfection piping comprised of a segment of inner biosolids piping concentrically arranged with a segment of outer steam piping, said segment of inner biosolids piping having a plurality of holes spirally arranged at a desired spacing around its perimeter, said system of disinfection piping being positioned within said storage tank;
   (c) first biosolids pump means for delivering a quantity of biosolids to said storage tank for disinfection;
   (d) second biosolids pump means for delivering a flow of biosolids from said storage tank to said segment of inner biosolids piping; and
   (e) steam pump means for delivering a flow of steam to said segment of outer steam piping and thereby injecting a flow of steam from said outer steam piping into said inner biosolids piping through said holes in said inner biosolids piping.

12. The biosolids treatment system as recited in claim 11 further comprising computerized control means for continuously and simultaneously monitoring said flow of biosolids and controlling said first and second biosolids pump means and said steam pump means for circulating a flow of biosolids through said inner biosolids piping simultaneously with a flow of steam through said outer steam piping over a predetermined period of time and at predetermined temperature ranges.

13. The biosolids treatment system as recited in claim 12 wherein said control means includes means for determining the temperature of said flow of biosolids at desired points along said system of disinfection piping.

14. The biosolids treatment system as recited in claim 13 wherein said control means includes means for determining the temperature and pressure of said flow of steam at desired points along said system of disinfection piping.

15. The biosolids treatment system as recited in claim 14 wherein said segment of inner biosolids piping includes a plurality of rotatably mounted Archimedes spiral screws positioned within bore of said inner biosolids piping at desired locations.

16. The biosolids treatment system as recited in claim 15 wherein said holes in said inner biosolids piping are tapered.

17. A method of treating wastewater containing a quantity of biosolids comprising:
   (a) providing a biosolids storage tank;
   (b) providing a system of disinfection piping positioned within said storage tank, said system of disinfection piping having a segment of inner biosolids piping concentrically arranged with a segment of outer steam piping, said segment of inner biosolids piping having a plurality of holes spirally arranged at a desired spacing around its perimeter;
   (c) providing a first biosolids pump means for delivering a flow of biosolids to said storage tank;
   (d) providing a second biosolids pump means for delivering a flow of biosolids from said storage tank to said segment of inner biosolids piping;
   (e) providing a means for generating a quantity of steam;
   (f) providing steam pump means for delivering a quantity steam from said means for generating a quantity of steam to said outer steam piping and then to said inner biosolids piping through said holes in said inner biosolids piping so as to heat and spirally rotate said flow of biosolids in said biosolids piping;
   (g) providing piping means to return steam recovered from said outer steam piping to said means for generating a flow of steam;
   (h) returning steam recovered from said outer steam piping to said means for generating a flow of steam providing piping means;
   (i) providing piping means for receiving biosolids from said inner piping system; and
   (j) receiving biosolids from said inner piping system and delivering said received biosolids to a desired location.

18. The method of treating wastewater containing a quantity of biosolids as recited in claim 17 further comprising the steps of:
   (a) providing control means for said;
   (b) providing monitor means for measuring the temperature and flow rate of said flow of biosolids in said inner biosolids piping and the temperature, pressure and flow rate of said flow of steam in said outer steam piping at desired locations along said segment of inner biosolids piping and for generating signals of the temperatures, pressures and flow rates so measured;
   (c) providing means for delivering said temperature, pressure and flow rate signals to said control means for generating control signals; and
   (d) delivering said control signals to said first and second biosolids pump means and said steam pump means for regulating the temperature, pressure and flow rate of said flow of steam in said outer steam piping and said flow of biosolids in said inner biosolids piping.

19. The method of treating wastewater containing a quantity of biosolids as recited in claim 18 wherein said step of delivering said received biosolids to a desired location includes delivering said biosolids to a land farm.

20. The biosolids treatment system as recited in claim 19 wherein the step of providing a system of disinfection piping includes providing a plurality of rotatably mounted Archimedes spiral screws positioned within bore of said inner biosolids piping at desired locations.

21. The method of treating wastewater containing a quantity of biosolids as recited in claim 19 wherein said biosolids are generated from municipal sewage.

22. The method of treating wastewater containing a quantity of biosolids as recited in claim 19 wherein said holes in said inner biosolids piping are tapered.

23. The method of treating wastewater containing a quantity of biosolids as recited in claim 22 wherein said tapered holes have a diameter at the outer surface of said biosolids piping of about 1.5 to about 3 times greater than the diameter of said holes at the inner surface of said biosolids piping.

24. The method of treating wastewater containing a quantity of biosolids as recited in claim 18 wherein said step of delivering said received biosolids to a desired location includes delivering said received biosolids to a VOC extraction unit for removal of any volatile gases that might be contained in the disinfected solids.

25. The method of treating wastewater containing a quantity of biosolids as recited in claim 24 further comprises the step of delivering said biosolids to a centrifuge for further dewatering.

26. The method of treating wastewater containing a quantity of biosolids as recited in claim 17 wherein said step of providing a system of disinfection piping positioned within said storage tank includes providing said piping system configured in a coil.

27. The biosolids treatment system as recited in claim 2 wherein said system of disinfection piping is configured in a coil.

28. The biosolids treatment system as recited in claim 10 wherein said system of disinfection piping is configured in a coil.

29. The biosolids treatment system as recited in claim 28 wherein said inner biosolids piping includes a plurality of rotatably mounted Archimedes spiral screws positioned within the bore of said inner biosolids piping at desired locations.

30. The biosolids treatment system as recited in claim 11 wherein said system of disinfection piping is configured in a coil.

31. The biosolids treatment system as recited in claim 14 wherein said holes in said inner biosolids piping are tapered so that said holes have a diameter at the outer surface of said biosolids piping of about 1.5 to about 3 times greater than the diameter of said holes at the inner surface of said biosolids piping.

* * * * *